United States Patent
Yeo

(10) Patent No.: US 6,760,162 B2
(45) Date of Patent: Jul. 6, 2004

(54) PROJECTION DISPLAY SYSTEM

(75) Inventor: Sang Ok Yeo, Kyonggi-do (KR)

(73) Assignee: LG Electronics, Inc., Seoul (KR)

( * ) Notice: Subject to any disclaimer, the term of this patent is extended or adjusted under 35 U.S.C. 154(b) by 12 days.

(21) Appl. No.: 10/209,472

(22) Filed: Jul. 30, 2002

(65) Prior Publication Data

US 2003/0053010 A1 Mar. 20, 2003

(30) Foreign Application Priority Data

Jul. 31, 2001 (KR) ......................................... 2001-46116

(51) Int. Cl.[7] ............................................... G02B 9/00
(52) U.S. Cl. ......................................... 359/651; 349/95
(58) Field of Search ........................ 349/5–10; 359/651

(56) References Cited

U.S. PATENT DOCUMENTS 5,267,063 A * 11/1993 Ray ............................ 349/67
5,442,484 A * 8/1995 Shikawa ..................... 359/651
5,745,297 A * 4/1998 Kaneko et al. .............. 359/651

* cited by examiner

Primary Examiner—Toan Ton
Assistant Examiner—Michael H. Caley
(74) Attorney, Agent, or Firm—Lee, Hong, Degerman, Kang & Schmadeka, P.C.

(57) ABSTRACT

A projection display system is disclosed, which enables aberration correction and can reduce the size of the system. The projection display system includes a liquid crystal panel displaying an image, a first lens group having a positive refractive power, formed by combination of two or more lenses, and correcting aberration of incident light from the liquid crystal panel, a total reflection mirror reflecting the incident light from the first lens group in a predetermined direction, and a second lens group having a negative refractive power, formed by combination of two or more lenses, and correcting aberration of the incident light from the total reflection mirror.

12 Claims, 7 Drawing Sheets

PROJECTION DISPLAY SYSTEM

This application claims the benefit of the Korean Application No. P2001-46116 filed on Jul. 31, 2001, which is hereby incorporated by reference.

BACKGROUND OF THE INVENTION

1. Field of the Invention

The present invention relates to a projection display system, and more particularly, to a projection display system having project lenses that enable aberration correction and movement.

2. Discussion of the Related Art

Recently, with increase of request for a large sized screen and high picture quality, projection systems that enlarge and project small images using a projection lens have been rapidly spread.

Examples of a projection system include a front projection system and a rear projection system depending on a direction of an image projected on a screen.

The rear projection system has received much attention due to an advantage that a relatively bright image can be displayed even in a place where surroundings are bright.

A good example of the rear projection system includes a projection television.

In the projection TV, a cathode ray tube (CRT) mode has been used as a light source for displaying small images.

The projection TV of a CRT mode has a limitation in obtaining a small and lightweight size due to a weight of the CRT. For this reason, it is difficult to display a large sized screen and obtain luminance required for high resolution in the projection TV.

To solve such problems, there has been suggested a projection TV based on a flat display that can obtain a large sized screen at a thin thickness.

Examples of a flat display include liquid crystal display (LCD), plasma display panel (PDP), field emission display (FED), and electro-luminescence (EL) device.

Of them, a projection TV based on LCD projects light emitted from a light source onto the LCD and displays an image of a liquid crystal panel on a screen using a projection lens system.

Since the image is enlarged and projected on the screen using the liquid crystal panel of high picture quality and a small size, a large sized screen image can easily be obtained and a small and lightweight sized projection system can be obtained.

The projection display system based on a liquid crystal panel can obtain relatively high resolution and high luminance compared to the CRT. Therefore, it is expected that a large sized screen can be displayed.

FIG. 1 illustrates a related art projection display system based on a liquid crystal panel.

Referring to FIG. 1, the related art projection display system includes an optical engine 11, a total reflection mirror 14, and a screen 15. The optical engine 11 includes a lighting system 11, a liquid crystal panel 12, and a projection lens system 13.

The lighting system generates light and irradiates the generated light onto the liquid crystal panel 12. The liquid crystal panel 12 displays an image by controlling transmittivity of incident light from the lighting system 11 in accordance with an image signal. The projection lens system 13 enlarges and projects the image from the liquid crystal panel 12 and displays the image on the screen 15. Thus, a viewer can view the image displayed on the screen 15.

In this case, the image projected by the projection lens system 13 is totally reflected by the total reflection mirror 14 to change a light path. The image moves to the screen by the changed light path and then is displayed on the screen 15.

If the projected image is directly projected from the rear of the screen 15 without any change of the light path by the total reflection mirror 14, the thickness of the system becomes great. Accordingly, it is desirable to change the light path using the total reflection mirror 14 so as to reduce the thickness of the system.

In more detail, as shown in FIGS. 2 and 3, the related art projection display system includes first and second fly eye lenses (FEL) 22 and 24 arranged between a light source 20 and a first dichroic mirror 30, a polarizing beam splitter array (PBS array) 26, and a focusing lens 28.

The related art projection display system further includes a first total reflection mirror 32, a second dichroic mirror 34, a first relay lens 36, a green liquid crystal panel 44G, a second relay lens 36, a third total reflection mirror 42, a dichroic prism 46, a projection lens 48, and a screen 50.

The first total reflection mirror 32 is arranged between the first dichroic mirror 30 and a red liquid crystal panel 44R. The second dichroic mirror 34 and the first relay lens 36 are arranged between the first dichroic mirror 30 and a second total reflection mirror 38. The second relay lens 40 and the third total reflection mirror 42 are arranged between the second total reflection mirror 38 and a blue liquid crystal panel 44B. The dichroic prism 46 is arranged on three surfaces of the liquid crystal panels 44R, 44G, and 44B.

It is a general tendency that the aforementioned projection display system has a small size and is lightweight.

To make the size of the screen great and reduce the thickness of the system in accordance with such a general tendency, it is necessary to make a projection distance between the screen 50 and the projection lens 48 short.

The projection lens system includes a first lens group having a positive refractive power, and a second lens group having a negative refractive power. A total reflection mirror for changing the light path is disposed between the first lens group and the second lens group to form an "L" shaped projection lens system. Thus, the thickness and the height of the system can be reduced.

However, the "L" shaped projection lens system should make the negative refractive power of the second lens group great to obtain a short projection distance. In this case, aberration such as distortion, coma, and astigmatism occurs.

SUMMARY OF THE INVENTION

Accordingly, the present invention is directed to a projection display system that substantially obviates one or more problems due to limitations and disadvantages of the related art.

An object of the present invention is to provide a projection display system that enables aberration correction and can reduce the size of the system.

Another object of the present invention is to provide a projection display system that enables movement of lenses to obtain an image of high definition.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a projection display system includes a liquid crystal panel displaying an image, a first lens group having a positive refractive power, formed by combination of two or more lenses, and correcting aberration of incident light from the liquid crystal panel, a total reflection mirror reflecting the incident light from the first lens group in a predetermined direction, and a second lens group having a negative refractive power, formed by combination of two or more lenses, and correcting aberration of the incident light from the total reflection mirror.

The distance between the liquid crystal panel and the first and second lens groups is based on a focal distance and is determined to satisfy the following conditions:

2.0<bf1/f1<2.8;
0.6<f2/f1<1.0; and
4.0<d/f2<5.0, wherein bf1 represents a focal distance between the liquid crystal panel and a lens included in the first lens group nearest to the liquid crystal panel, fl represents a focal length of the whole projection lens system including the total reflection mirror, the first lens group, and the second lens group, f1 represents a focal distance of the first lens group, f2 represents a focal distance of the second lens group, and d represents a distance between the first and second lens groups.

The first lens group corrects chromatic aberration and spherical aberration of light while the second lens group corrects astigmatism and distortion of light.

Also, the first lens group includes at least one or more plastic non-spherical lenses having a positive refractive power while the second lens group includes at least one or more plastic non-spherical lenses having a negative refractive power.

The total reflection mirror reflects incident light from the first lens group upon the second lens group at a predetermined angle. The predetermined angle is defined as an angle θ between an optical axis of the incident light from the first lens group and an optical axis of light emitted to the second lens group by being reflected by the total reflection mirror, and is within the range of 30 to 90.

The total reflection mirror is made of glass or plastic material and has a reflecting surface of a plane shape or non-spherical surface shape.

Furthermore, the first lens group focuses an image on the screen by moving at a predetermined distance or by moving a spherical lens arranged near the total reflection mirror among spherical lenses of the first lens group. The second lens group focuses an image on the screen by moving at a predetermined distance.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
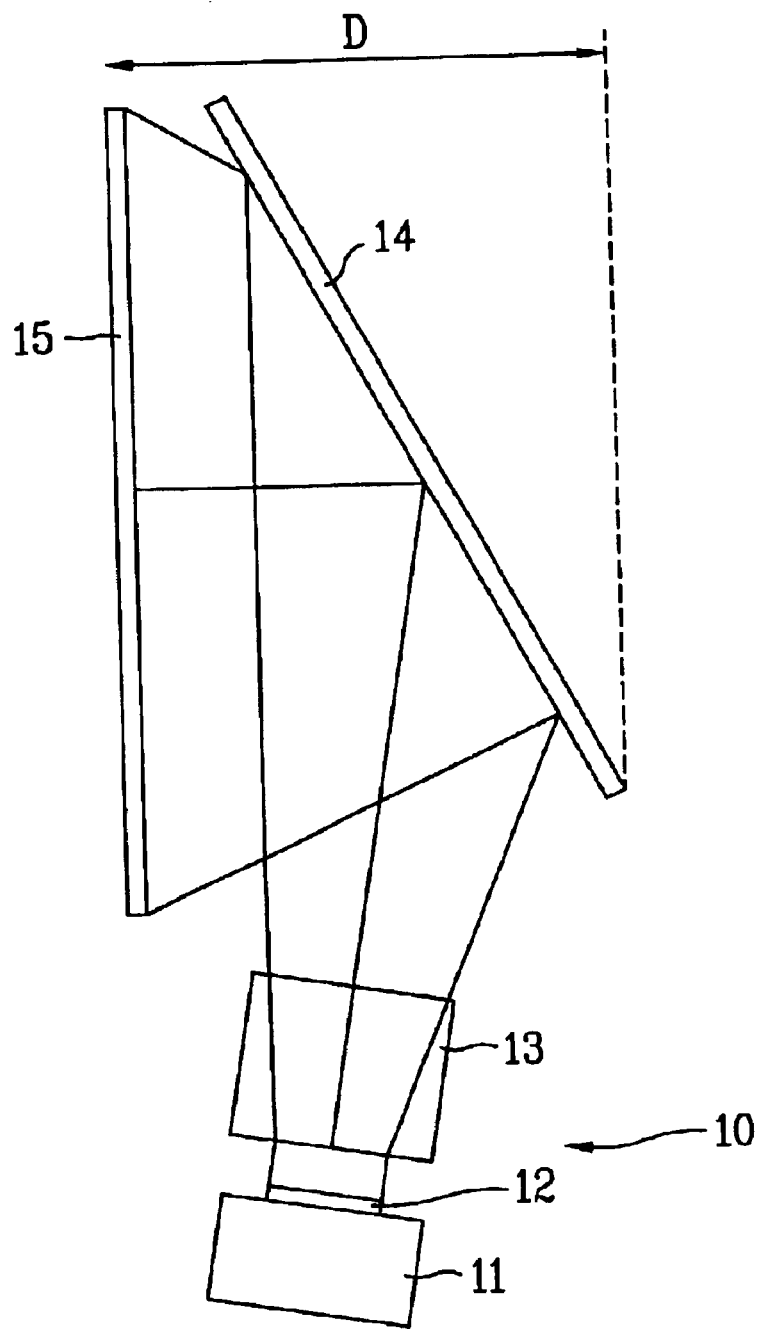
FIG. 1 illustrates a related art projection display system based on a liquid crystal panel.
Figure 2:
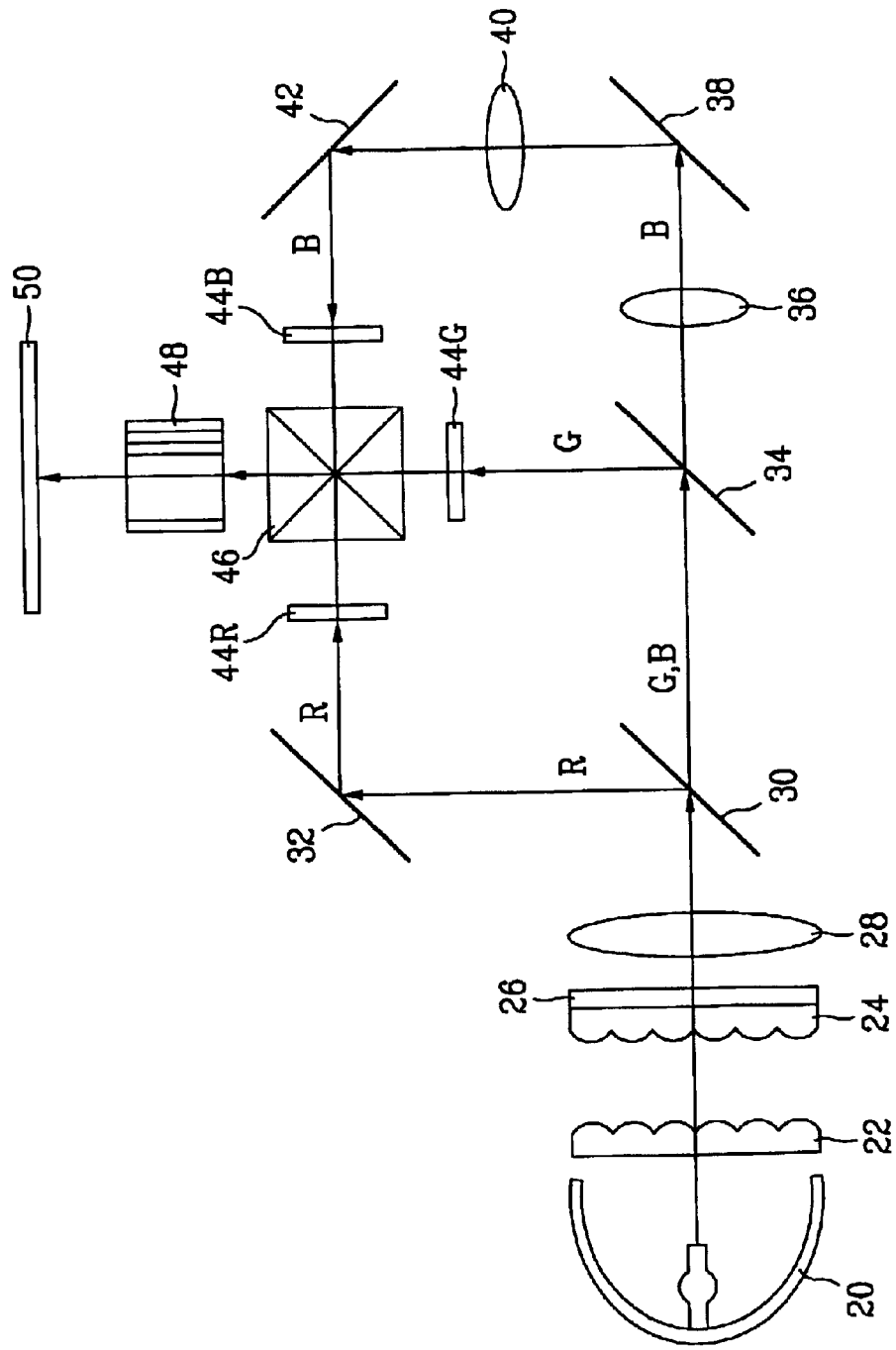
FIG. 2 illustrates a related art projection display system of FIG. 1.
Figure 3:
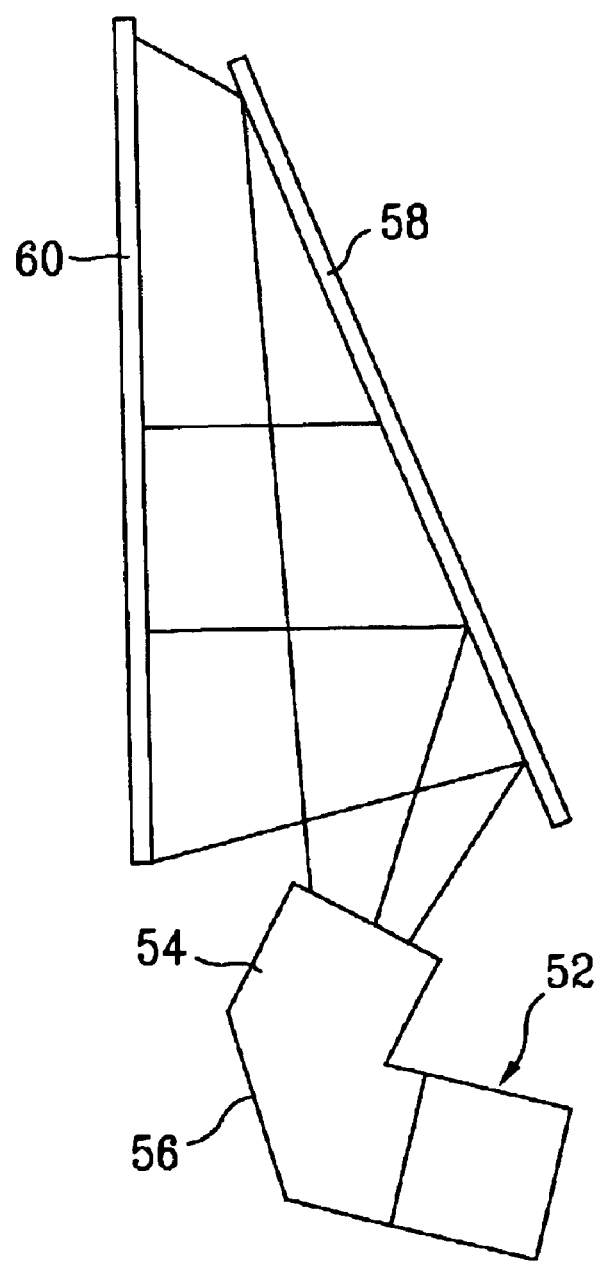
FIG. 3 illustrates a projection display system according to the embodiment of the present invention.

FIG. 3 illustrates a projection display system according to the embodiment of the present invention.

As shown in FIG. 3, the projection display system according to the present invention includes an optical engine 52, a first total reflection mirror 56, a projection lens system 54, a second total reflection mirror 58, and a screen 60. The optical engine 52 includes a lighting system and a liquid crystal panel. The projection lens system 54 enlarges and projects the image from the liquid crystal panel. The second total reflection mirror 58 moves the light path from the projection lens system 54 to the screen 60. The screen 60 displays the image formed from the second total reflection mirror 58 on the screen.

The lighting system of the optical engine 52 generates light and irradiates the generated light onto the liquid crystal panel. The liquid crystal panel displays an image by controlling transmittivity of light from the lighting system in accordance with an image signal.

The projection lens system 54 has "L" shape by means of the total reflection mirror 56, and enlarges and projects the image from the liquid crystal panel and displays the image formed from the liquid crystal panel on the screen 60.

The projection lens system 54 will be described in more detail with reference to FIGS. 4 and 5.

Figure 4:
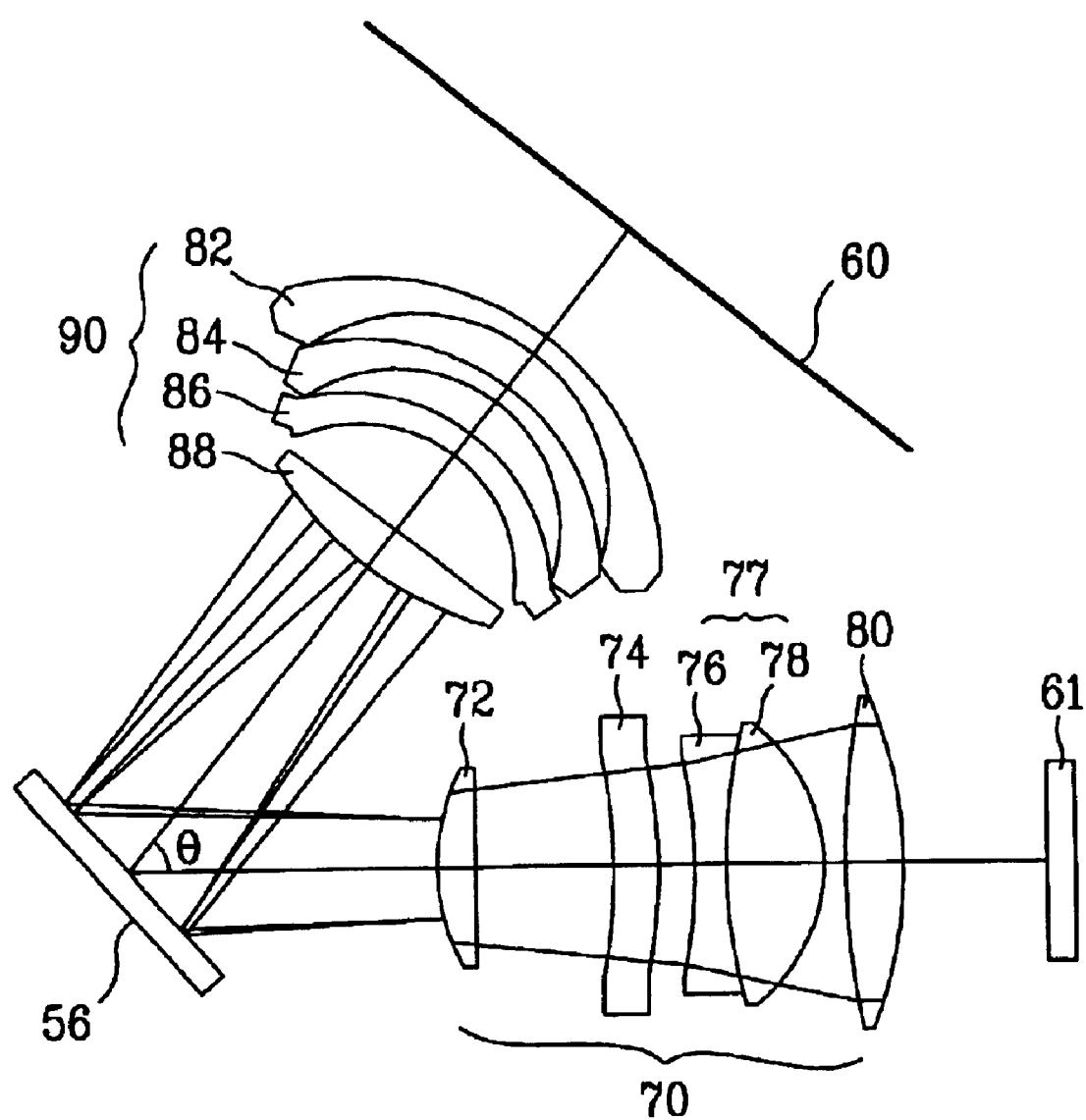
FIG. 4 illustrates a projection lens system of FIG. 3.
Figure 5:
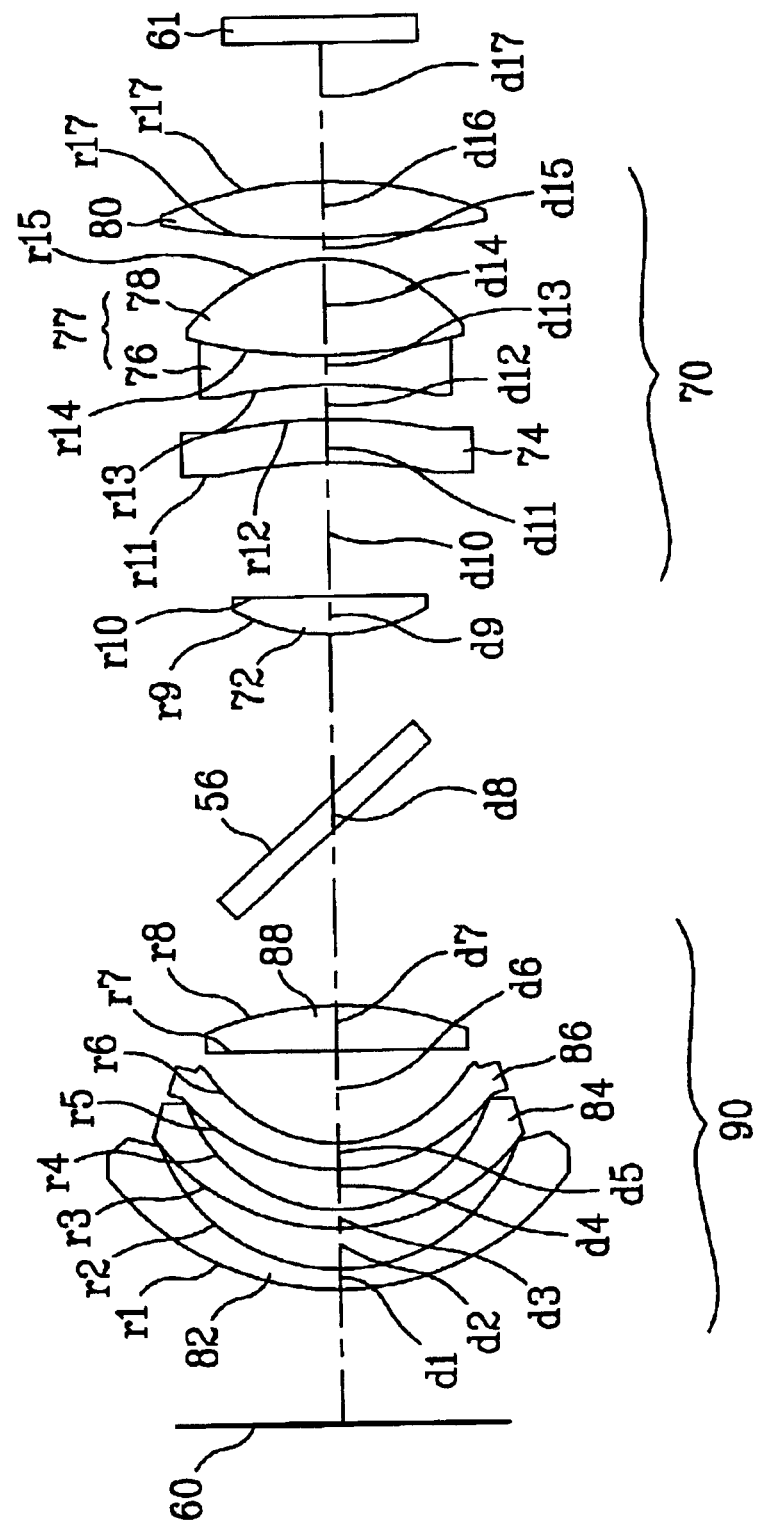
FIG. 5 illustrates a projection lens system of FIG. 4 on a straight line.

Referring to FIGS. 4 and 5, the projection lens system 54 includes a first lens group 70 having a positive refractive power, a second lens group 90 having a negative refractive power, and a total reflection mirror 56. The first lens group 70, the second lens group 90, and the total reflection mirror 56 are provided between a liquid crystal panel 61 and a screen 60. The total reflection mirror 56 is arranged between the first lens group 70 and the second lens group 90.

The first lens group 70 includes a first spherical lens 72 having a positive refractive power, a plastic non-spherical lens 74 having a positive refractive power, a contact lens 77 that contacts a positive spherical lens 76 with a negative spherical lens 78, and a second spherical lens 80 having a positive refractive power.

The first lens group 70 acts to correct chromatic aberration and spherical aberration of incident light from the liquid crystal panel 61.

The total reflection mirror 56 converts an advance path of light passed through the first lens group 70 so as to move to the second lens group 90.

In other words, the total reflection mirror 56 reflects the incident light from the first lens group 70 upon the second lens group 90 at a predetermined angle. The predetermined angle is defined as an angle θ between an optical axis of the incident light from the first lens group 70 and an optical axis of light emitted to the second lens group 90 by being reflected by the total reflection mirror 56. Such a predetermined angle is within the range of 30 to 90.

The total reflection mirror 56 is made of glass or plastic material. A reflecting surface of the total reflection mirror 56 has a plane shape or non-spherical surface shape.

The second lens group 90 includes first and second convex lenses 82 and 84 having a negative refractive power, a plastic non-spherical lens 86, and a spherical lens 88 having a positive refractive power. By combination of such lenses, the second lens group 90 has a negative refractive power as a whole.

The first and second convex lenses 82 and 84 are in contact with the non-spherical lens 86 at their edges.

The second lens group 90 is to correct distortion and astigmatism of light emitted from the total reflection mirror 56.

The aforementioned projection lens system 54 satisfies the following conditions.

The following equation (1) is directed to a ratio of bf1 to f1, i.e., a retro ratio, and determines the size that can arrange the projection lens system between the liquid crystal panel 61 and the screen 60.

$$2.0 < bf1/f1 < 2.8 \quad (1)$$

Wherein, bf1 defined as a back focal length represents a focal distance between the liquid crystal panel 61 and the spherical lens 80 of the first lens group 70, and f1 defined as a focal length represents a focal distance of the whole lenses.

If the retro ratio has a value of 2.8 or greater, the size of the projection lens system becomes greater. In this case, it is difficult to correct aberration.

On the other hand, if the retro ratio has a value of 2.8 or below, better aberration and optical characteristics can be obtained but it is difficult to form the system.

Accordingly, the value of the retro ratio should satisfy the condition of the equation (1).

The following equation (2) represents a refractive power of the first lens group 70 and the second lens group 90 and shows the condition that can correct aberration.

$$0.6 < f2/f1 < 1.0 \quad (2)$$

Wherein, f1 represents a focal distance of the first lens group 70, and f2 represents a focal distance of the second lens group 90.

If a ratio of the focal distance between the first and second lens groups 70 and 90 is greater than 1.0, the refractive power of the second lens group 90 becomes weak so as to facilitate aberration correction. However, the distance between the screen 60 and the projection lens system 54 becomes longer. In this case, formation of the system having a thin size becomes difficult.

Also, if a ratio of the focal distance between the first and second lens groups 70 and 90 is less than 0.6, the refractive power of the second lens group 90 becomes intensive so as to facilitate a small size and ultra wide optical angle of the projection lens system 54.

However, a surface R2 of the first convex lens 82 in the second lens group 90 becomes close to hemisphere so as to make its production impossible and cause astigmatism and upper surface curvature.

Therefore, the ratio of f2 and f2 should satisfy the condition of the equation (2).

The following equation (3) represents whether a total reflection mirror can be arranged between the first lens group 70 and the second lens group 90.

$$4.0 < d8/f2 < 5.0 \quad (3)$$

Wherein, d8 represents a focal distance between the first lens group 70 and the second lens group 90, and f2 represents a focal distance of the second lens group 90.

In the equation (3), if a d8 to f2 ratio is less than 4.0, the distance between the first and second lens groups 70 and 90 becomes short. In this case, it is difficult to arrange the total reflection mirror 56 between the first lens group 70 and the second lens group 90.

Also, if a d8 to f2 ratio is greater than 5.0, the system of the projection lens system 54 becomes longer. In this case, formation of the system having a thin size becomes difficult. Accordingly, the d8 to f2 ratio should satisfy the condition of the equation (3).

Meanwhile, if the projection lens system 54 focuses an image on the screen by moving the whole lens system, the center of the screen 60 is not adapted to the center of the liquid crystal panel 61. As a result, the image deviates from the screen 60. To avoid deviation of the image, a separate device is required. In this case, a problem arises in that the production cost increases, thereby reducing productivity.

To solve such a problem, the projection lens system 54 of the present invention focuses the image on the screen by moving some lenses, thereby improving definition of the image.

In other words, the image is focused on a focal point on the screen 61 by moving either the spherical lens 72 in the first lens group 70 or the second lens group 90. Also, the image of high definition can be obtained without deviating from the screen 60.

The following Table 1 shows factors that can be used for design of a projection lens system, such as a curvature radius 'r' of each lens surface shown in FIG. 5, the distance 'd' between lens surfaces, and data of refractive index $N_d$ in each lens.

In Table 1, the focal distance is 1.0 mm, a constant Fnumber that shows brightness of the projection lens is 2.35, and 2ω is 86.33°, wherein ω represents an angle of view between the projection lens system and the screen.

TABLE 1

| Lens surface | r | d | $N_d$ |
| --- | --- | --- | --- |
| s1 | 4.50289 | 0.301758 | 1.618808 |
| s2 | 2.53018 | 0.840242 | |
| s3 | 5.92254 | 0.181055 | 1.486403 |
| s4 | 2.05829 | 0.740070 | |
| s5 | 8.17683 | 0.347021 | 1.490423 |
| s6 | 2.08055 | 0.905273 | |
| s7 | 0.0 | 0.331934 | 1.800485 |
| s8 | −8.62906 | 4.319051 | |
| s9 | 3.95635 | 0.232957 | 1.770094 |
| s10 | −286.54312 | 1.569140 | |
| s11 | −6.63867 | 0.392285 | 1.490423 |
| s12 | −3.79238 | 0.282176 | |
| s13 | −2.90122 | 0.168984 | 1.800485 |
| s14 | 5.74535 | 0.619810 | 1.618808 |
| s15 | −2.71648 | 0.060352 | |
| s16 | 7.16995 | 0.581789 | 1.694847 |
| s17 | −3.85948 | 2.508600 | |
| s18 | 0.00000 | 2.508600 | |

Non-spherical coefficients that determine shapes of lens surfaces s5, s6, s11, and s12 of a non-spherical lens shown in Table 1 are defined by the following non-spherical equation (4).

$$X(r) = \frac{cr^2}{1 + (1 - Kc^2r^2)^{1/2}} + a_1 \cdot r^4 + a_2 \cdot r^6 + a_3 \cdot r^8 + \ldots \quad (4)$$

Wherein, X(r) represents a Sag value of a non-spherical surface at a point having a height 'r' from an optical axis, c represents a curvature of a lens surface at the optical axis, K represents a conic constant, and $a_1$, $a_2$, $a_3$, and $a_4$ represent non-spherical coefficients.

The coefficient values of the shapes of the non-spherical lens surface are as follows.

TABLE 2

| Lens surface | s5 | s6 | s11 | s12 |
| --- | --- | --- | --- | --- |
| K | 0.0 | 0.0 | 0.0 | 0.0 |
| a1 | 0.294763E−01 | 0.747054E−02 | 0.121644E−01 | 0.429228E−01 |
| a2 | −0.112262E−01 | −0.195586E−01 | 0.122678E−01 | 0.139820E−01 |
| a3 | 0.290756E−02 | 0.469941E−02 | −0.304741E−02 | 0.814854E−03 |
| a4 | −0.319147E−03 | −0.875964E−03 | 0.181762E−03 | 0.598569E−03 |

Figure 6A:
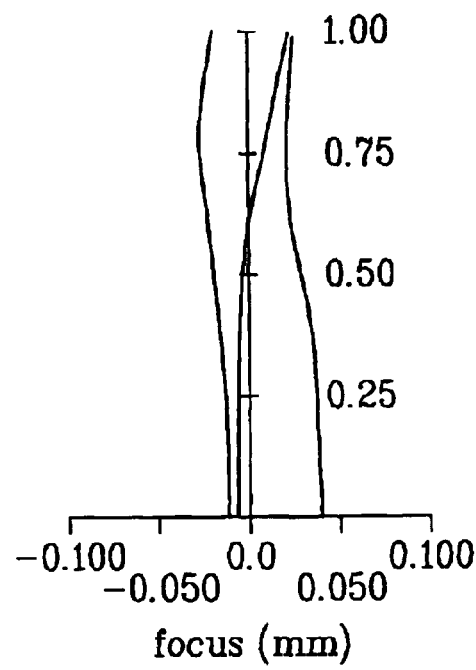
FIGS. 6A to 6C are graphs illustrating aberration characteristics of a projection lens system of FIG. 3.
Figure 6B:
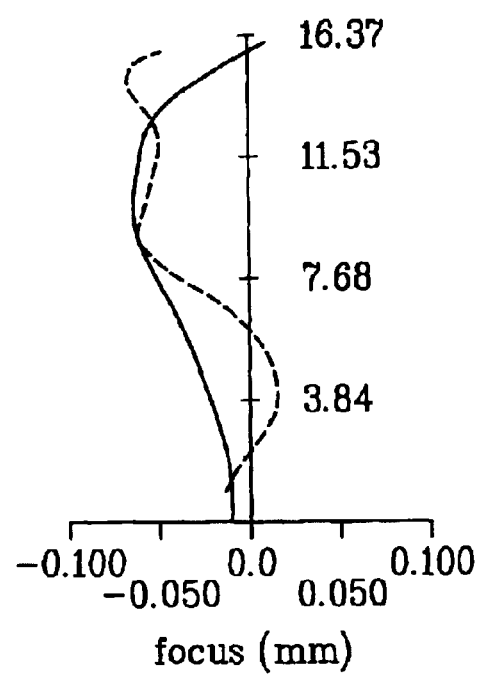
Figure 6C:
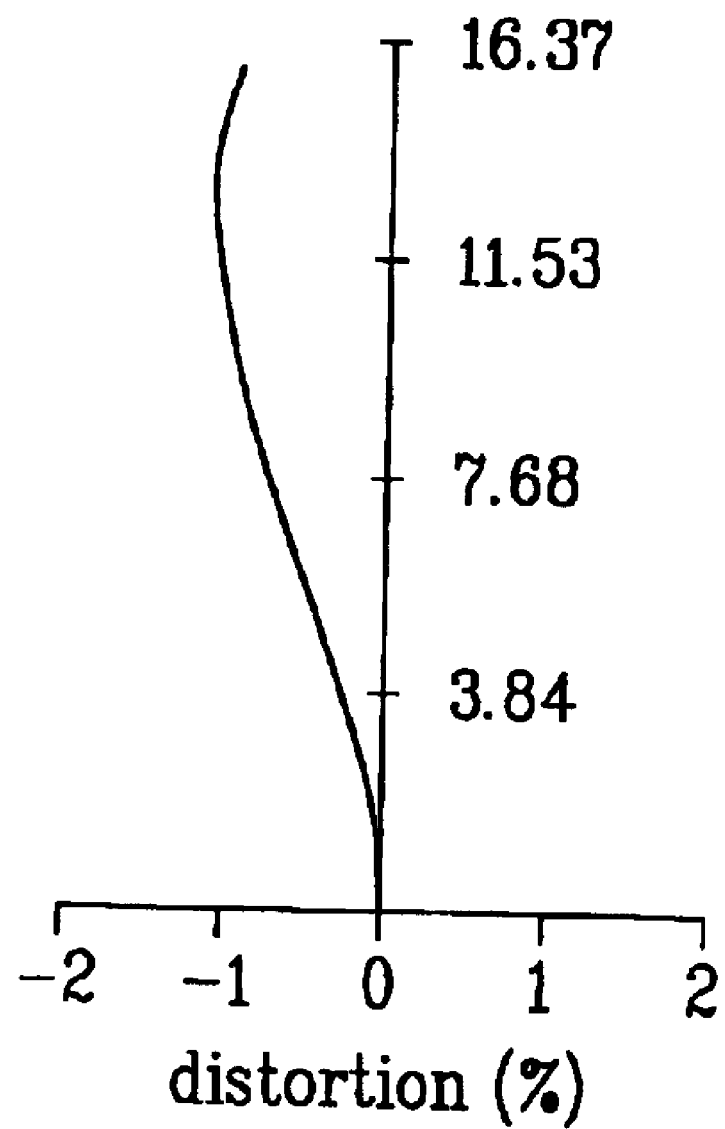

FIGS. 6A to 6C are graphs illustrating aberration characteristics of the projection lens system.

FIG. 6A shows spherical aberration characteristic of the projection lens system. Referring to FIG. 6A, it is noted that values of the spherical aberration depend on the height of a plane on which a focal point is formed. It is also noted that the spherical aberration deviating from the focal point of the projection lens system is within the range of +0.5 mm~−3 mm.

FIG. 6B shows upper curvature characteristic of the projection lens system. Referring to FIG. 6B, it is noted that values of the upper curvature depend on the height of a plane on which a focal point is formed. It is also noted that the upper curvature deviating from the focal point of the projection lens system is within the range of +0.02 mm~−0.05 mm.

FIG. 6C shows distortion characteristic of the projection lens system. Referring to FIG. 6C, it is noted that values of distortion depend on the height of a plane on which a focal point is formed. It is also noted that the distortion deviating from the focal point of the projection lens system is within the range of +0.0 mm~−5 mm.

As described above, the projection display system according to the present invention has the following advantages.

The aberration characteristic of the projection lens system according to the present invention can correct spherical aberration, upper curvature, and distortion and obtain high performance of the projection lens system unlike the related art one. In addition, since the size of the projection lens system that can be arranged between the liquid crystal panel and the screen is limited, aberration, upper curvature, and astigmatism can be corrected.

Finally, since the projection lens system of the present invention focuses the image on the exact position of the screen by moving the lens or lens group, the image of high definition can be obtained.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A projection display system comprising:

a liquid crystal panel displaying an image;

a first lens group having a positive refractive power, formed by combination of two or more lenses, and correcting aberration of incident light from the liquid crystal panel;

a total reflection mirror reflecting the incident light from the first lens group in a predetermined direction;

a second lens group having a negative refractive power, formed by combination of two or more lenses, and correcting aberration of the incident light from the total reflection mirror; and a distance between the liquid crystal panel and the first and second lens groups is based on a focal distance and is determined to satisfy the following conditions:

2.0<bf1/f1<2.8;

0.6<|f2/f1|<1.0; and 4.0<d/f2<5.0, wherein bf1 represents a focal distance between the liquid crystal panel and a lens included in the first lens group nearest to the liquid crystal panel, fl represents a focal length of the whole projection lens system including the total reflection mirror, the first lens group, and the second lens group, f1 represents a focal distance of the first lens group, f2 represents a focal distance of the second lens group, and d represents a distance between the first and second lens groups.

2. The projection display system of claim 1, wherein the first lens group corrects chromatic aberration and spherical aberration of light.

3. The projection display system of claim 1, wherein the second lens group corrects astigmatism and distortion of light.

4. The projection display system of claim 1, wherein the first lens group includes at least one or more plastic non-spherical lenses having a positive refractive power.

5. The projection display system of claim 1, wherein the second lens group includes at least one or more plastic non-spherical lenses having a negative refractive power.

6. The projection display system of claim 1, wherein the total reflection mirror reflects incident light from the first lens group upon the second lens group at a predetermined angle.

7. The projection display system of claim 6, wherein the predetermined angle is defined as an angle θ between an optical axis of the incident light from the first lens group and an optical axis of light emitted to the second lens group by being reflected by the total reflection mirror, and is within the range of 30° to 90°.

8. The projection display system of claim 1, wherein the total reflection mirror is made of glass or plastic material.

9. The projection display system of claim 1, wherein the total reflection mirror has a reflecting surface of a plane shape or non-spherical surface shape.

10. The projection display system of claim 1, wherein the first lens group focuses an image on the screen by moving at a predetermined distance.

11. The projection display system of claim 1, wherein the first lens group focuses an image on the screen by moving a spherical lens arranged near the total reflection mirror among spherical lenses of the first lens group.

12. The projection display system of claim 1, wherein the second lens group focuses an image on the screen by moving at a predetermined distance.

* * * * *